United States Patent [19]

Kuhn et al.

[11] Patent Number: 4,490,966

[45] Date of Patent: Jan. 1, 1985

[54] HITCH STRUCTURE FOR COUPLING AN IMPLEMENT TO A VEHICLE

[75] Inventors: John B. Kuhn; Lloyd A. Wykhuis, both of Mayville, Wis.

[73] Assignee: Deere & Company, Moline, Ill.

[21] Appl. No.: 505,044

[22] Filed: Jun. 16, 1983

[51] Int. Cl.³ .............................................. A01D 35/12
[52] U.S. Cl. ................................ 56/15.9; 56/DIG. 22
[58] Field of Search .................. 56/6, 13.6, 15.8, 15.9, 56/15.2, DIG. 22

[56] References Cited

U.S. PATENT DOCUMENTS

| | | | |
|---|---|---|---|
| 2,415,968 | 2/1947 | Price | 280/33.44 |
| 2,928,223 | 3/1960 | Danuser | 56/13.6 |
| 2,949,004 | 8/1960 | Jones | 56/DIG. 22 |
| 3,063,226 | 11/1962 | Pfauser | 56/6 |
| 3,136,106 | 6/1964 | Joslin | 56/DIG. 22 |
| 3,199,276 | 8/1965 | Hahn | 56/15.8 |
| 3,508,386 | 3/1970 | Borchardt et al. | 56/15.9 |
| 3,564,822 | 2/1971 | Engler | 56/15.9 |
| 3,589,450 | 6/1971 | Price | 56/15.9 |
| 3,654,749 | 4/1972 | Ostereran | 56/DIG. 22 |
| 3,680,880 | 8/1972 | Blaauw | 56/DIG. 22 |
| 3,834,142 | 9/1974 | Johnston et al. | 56/15.9 |
| 4,120,136 | 10/1978 | Rose | 56/DIG. 22 |
| 4,310,997 | 1/1982 | Streicher | 56/DIG. 22 |
| 4,313,295 | 2/1982 | Hansen | 56/DIG. 22 |
| 4,341,059 | 7/1982 | Gerzanich | 56/DIG. 22 |
| 4,441,306 | 4/1984 | Kuhn | 56/DIG. 22 |

*Primary Examiner*—Paul J. Hirsch

[57] ABSTRACT

A hitch structure includes a pair of arms each having their opposite ends vertically pivotally connected to a vehicle and an implement. The arms each include first and second sections pivotally inter-connected to each other at a location between the vehicle and an adjacent end of the implement. A stop block is carried by each first section and limits the flexure of the sections about their pivotal inter-connection. The remote end of the implement is supported on a pair of caster wheels and flexible members support the adjacent end of the implement from the arms. Lift actuators are connected to the arms and are operable to lower the first sections of the arms to the extent that the adjacent end of the implement rests on the ground.

4 Claims, 4 Drawing Figures

HITCH STRUCTURE FOR COUPLING AN IMPLEMENT TO A VEHICLE

BACKGROUND OF THE INVENTION

The present invention relates to a hitch structure for semi-mounted implements and more specifically relates to a hitch structure for mounting a mower to the front of a vehicle.

One type of semi-mounted implement which exemplifies the type with which the present invention is suited for use in front-mounted rotary mowers. Specifically, these mowers normally include a blade housing which when in a working position has its forward or leading end supported by one or more wheels and has its rearward or trailing end supported by a vehicle through means of a hitch structure carried by the vehicle. When a mower of this type is detached from the vehicle, the trailing portion of the blade housing rests on the ground. Then to hook up or reattach the mower to the vehicle, it is necessary with the known hitch structures for the operator to lift and manipulate the housing so as to align the mounting holes. The weight that has to be lifted, in the case of larger mowers, is considerable and makes the task very difficult for one man to do.

SUMMARY OF THE INVENTION

According to the present invention there is provided an improved hitch structure for attaching a semi-mounted mower to a vehicle.

An object of the invention is to provide a hitch structure which makes it possible for one man to easily attach a semi-mounted mower to a vehicle.

A more specific object is to provide a hitch structure including a pair of lift arms having opposite ends pivotally connected to the vehicle and to the mower, the lift arms having a pivot joint between their opposite ends for permitting the arms to be flexed from a normal working position so as to make it possible to hook up the mower without lifting it and to also permit the mower the follow undulations in ground contour once hooked up and in operation.

These and other objects will become apparent from a reading of the following specification together with the appended drawings.

DESCRIPTION OF THE PREFERRED EMBODIMENT

Figure 1:
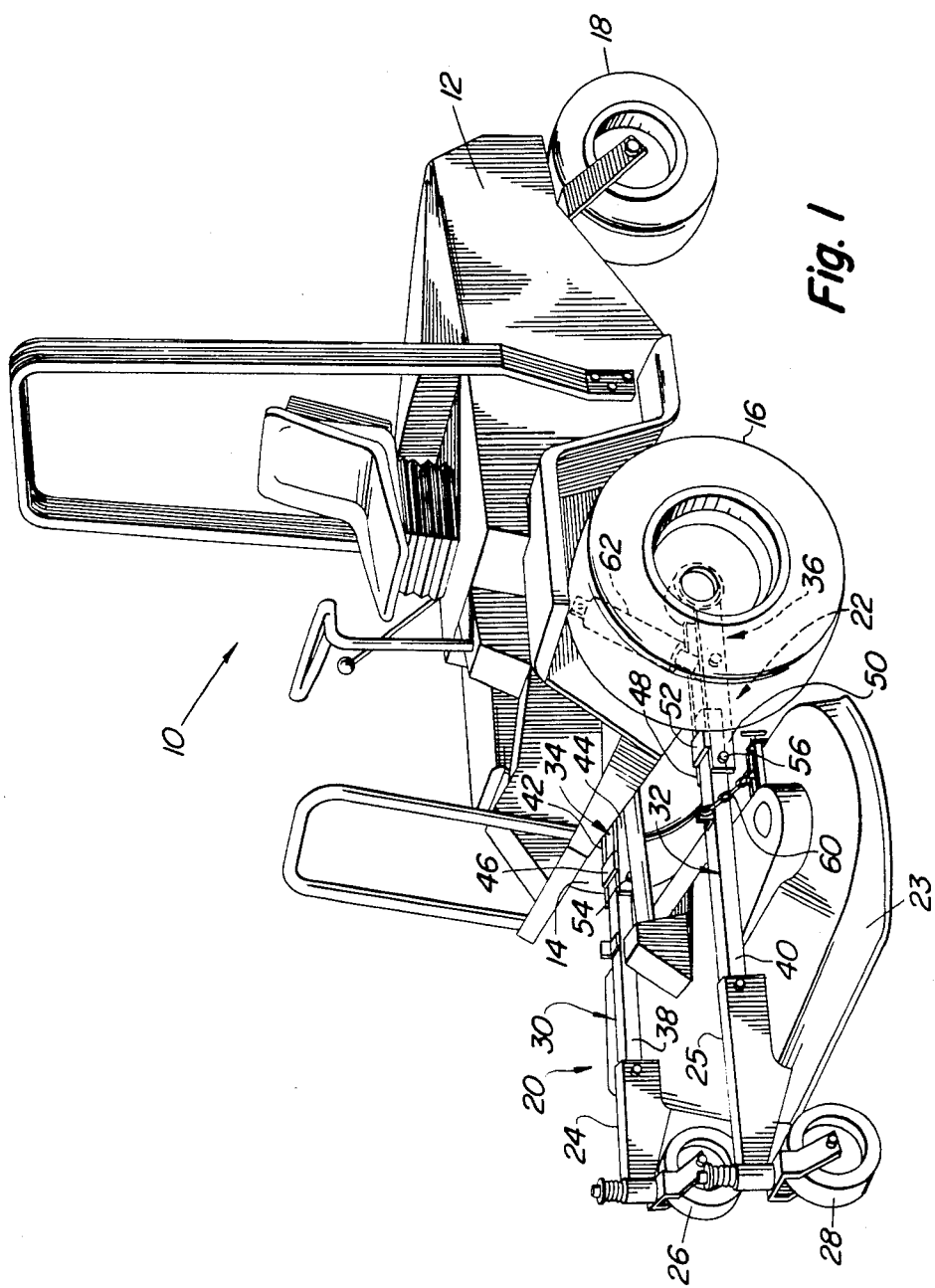
FIG. 1 is a left front perspective view of a front mounted mower attached to a vehicle by a hitch structure constructed in accordance with the principles of the present invention, with the mower drive being omitted and a portion of the vehicle frame being broken away for clarity.

Referring now to the drawings, there is shown a vehicle 10 including a main frame 12 which is generally triangular in top plan view with the base of the triangle being forward and supported at opposite corners by a pair of drive wheels 14 and 16 and with the remaining corner being rearward and supported by a caster wheel 18. The drive wheels 14 and 16 are preferably driven by separate hydraulic fluid motors (not shown) which are mounted in the opposite ends of a torque tube (not shown) forming part of the frame 12.

Figure 3:
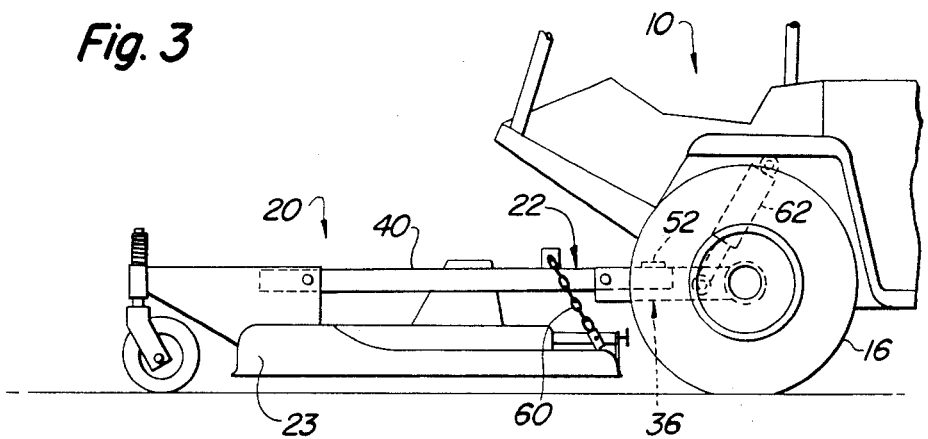

A rotary mower 20 is mounted to the forward end of the vehicle 10 by a hitch structure 22. The mower 20 includes a blade housing 23. Fixed to forward locations of the top of the housing are right and left, transversely spaced brackets 24 and 25. The forward or leading end of the housing is supported by right and left caster wheels 26 and 28 respectively mounted to forward projections of the brackets 24 and 25. The rearward or trailing end of the housing 23 is supported by right and left lift arms 30 and 32. The lift arms 30 and 32 respectively include short rear sections 34 and 36 having their rear ends mounted for rotation about the torque tube and long forward sections 38 and 40 having their forward ends pivotally connected to the brackets 24 and 25. The lift arm section 34 includes a pair of transversely spaced, parallel bars 42 and 44 having their tops joined by a stop block 46 spaced rearwardly from their forward ends. Similarly, the lift arm section 36 includes a pair of transversely spaced, parallel bars 48 and 50 having their tops joined by a stop block 52. The rearward ends of the forward arm sections 38 and 40 are respectively received between and pivotally connected to the parallel bars of the rear sections 34 and 36 by transverse pins 54 and 56 such that when the hitch structure is in a normal operating position, as shown in FIG. 3, the forward top portions of the lift arm sections 38 and 40 will be engaged with the undersides of the stop blocks 46 and 52. Chains (only the left chain 60 is visible) are connected between the arm sections 38 and 40 and the rearward portion of the housing 23.

Coupled to the frame 12 and to the arms for selectively exerting a lifting force on the arms 30 and 32 are right and left, single-acting hydraulic actuators (only the left actuator 62 is shown).

Figure 2:
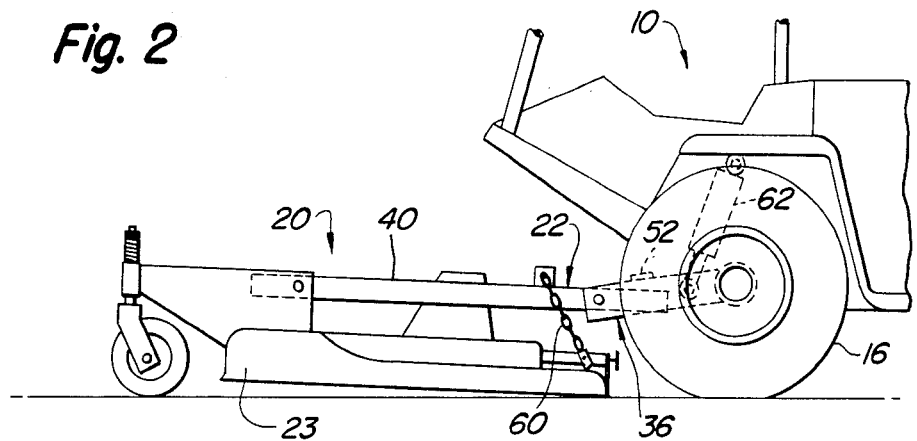
FIGS. 2-3 are schematic left side elevational views respectively showing the hitch structure in a pivoted hookup position, a straight normal operating portion and a pivoted operating position.

Referring now to FIG. 2, it can be seen that a lower rear portion of the housing 23 rests upon the ground when the hitch structure 22 is in a hook up position with the vehicle 10 and mower 20 being on a relatively level support surface. The control system (not shown) for the actuators 58 and 60 would then be in a condition permitting fluid to freely flow to and from the actuators so as to permit the arm sections 34 and 38 and the arm sections 36 and 40 to be easily manipulated to bring the holes for receiving the pins 54 and 56 into alignment without requiring the housing 23 to be lifted.

Once the mower 20 is hooked up to the vehicle 10, the hitch structure 22 is placed in its normal operating position, shown in FIG. 3, by pressurizing the actuators so as to exert a preselected lifting force on the lift arms 30 and 32 which brings the rearward upper surfaces of the forward arm sections 38 and 40 into engagement with the undersides of the stop blocks 46 and 52. The lift arms 30 and 32 are then in a straight or unflexed condition.

Figure 4:
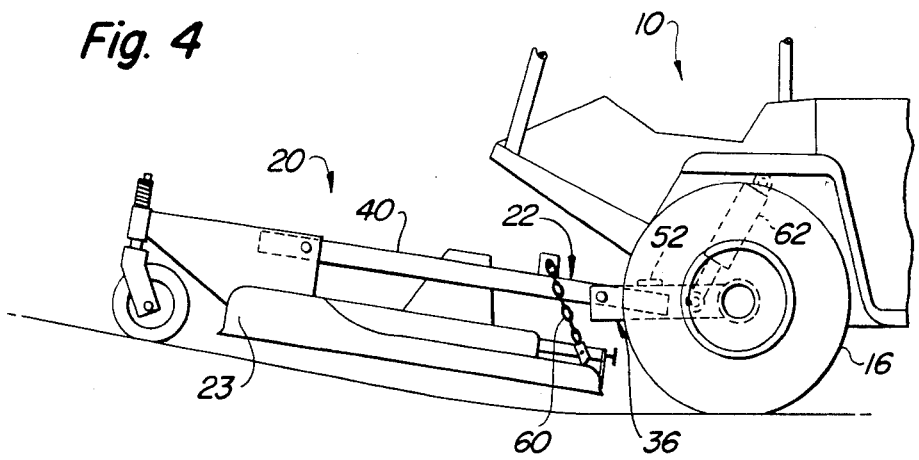

Should the vehicle 10 be operated so that the mower 20 precedes the vehicle in encountering a rise in the ground contour, the lift arms 30 and 32 will flex at the pins 54 and 56, as shown in FIG. 4, so that the rearward ends of the forward arm sections move away from the stop blocks resulting in the rear end of the housing 23 being maintained at a desired cutting level.

While not illustrated, it will be appreciated that the mower 20 can be completely elevated from the ground for transport by pressurizing the lift cylinders sufficiently to overcome the weight of the mower.

Further, it is to be understood that the hitch structure described herein could be used for mounting implements other than a rotary mower and could be used for mounting implements at the rear of a vehicle.

We claim:

1. In an implement and vehicle combination wherein the vehicle includes a pair of transversely spaced, fore-and-aft extending lift arms each having one end pivotally connected to the vehicle and having an opposite end pivotally connected to the implement, power means coupled to the pair of arms for selectively raising and lowering the latter and wherein the implement includes ground engaging means for supporting an end of the implement remote from the vehicle and a pair of flexible members respectively coupled between the pair of lift arms and the implement for supporting an end of the latter which is adjacent the vehicle, the improvement comprising: said arms each including first and second sections pivotally interconnected with each other by a transverse pivot located between the vehicle and the implement; each second section having one end pivotally connected to the implement and having a second end projecting beyond the transverse pivot; and a stop block carried by each first section at a location above the second end and being engaged therewith when the arms are in an unflexed, normal operating position wherein the flexible member is taut and supports that end of the implement which is adjacent the vehicle; and said first sections of said arms being moveable to a lowered position wherein the flexible members are slack and the last mentioned end of the implement rests upon the ground.

2. The implement and vehicle combination defined in claim 1 wherein said first sections of said arms each include a pair of parallel, transversely spaced, flat bars and said stop blocks respectively joining top surface portions of the pair of bars.

3. A hitch structure for supporting an implement in semi-mounted fashion from a vehicle, comprising: first and second transversely spaced, fore-and-aft extending arms; each arm including a first section and having a first end adapted to be pivotally mounted on a vehicle for vertical movement and a second section having a first end adapted to be pivotally mounted on an implement for vertical movement; the first and second sections of each arm being pivotally inter-connected to each other by a transverse pin and the second section having an end portion extending beyond the transverse pin and overlapping a portion of the length of the first section; and a stop block carried by the first section of each arm and located for engagement by the end portion of the second section when the arm is in an unflexed working condition.

4. The hitch structure defined in claim 3 wherein each of the first sections is bifurcated and the associated second section is received between the furcations.

* * * * *